Patented July 17, 1934

1,966,733

UNITED STATES PATENT OFFICE 1,966,733

PROCESS FOR PURIFYING WATER

Hans A. Reimers, Midland, Mich., assignor to The Dow Chemical Company, Midland, Mich., a corporation of Michigan No Drawing. Application August 3, 1932, Serial No. 627,366

7 Claims. (Cl. 210—23)

This invention relates to a process for treating and purifying water, and is concerned more particularly with the treatment of hard water containing dissolved silica or compounds thereof. An object of the invention is to remove silica or compounds thereof from water so as to prevent the deposition of silicate scale when the same is used for boiler feed purposes. Other objects and advantages will appear as the description proceeds.

Natural waters which require to be softened prior to use as boiler feed water or other purposes frequently contain besides the usual substances capable of forming boiler scale, such as carbonate or sulphate of calcium, a certain amount of silica in the dissolved state, possibly as a compound such as sodium silicate. When employing such waters for boiler feed purposes, after the ordinary softening procedures have been applied for the partial removal of the cations such as calcium and magnesium, scale containing the silicates formed from the residual calcium and magnesium with the silica available in the water may be deposited upon the heating surfaces of the boiler as a dense impervious rock-like coating that is difficult to remove.

The formation of silicate scale is particularly troublesome in boilers operating at pressures over 250 lbs./sq. in., as, at the temperatures corresponding to such pressures, the carbonates are decomposed, thus leaving calcium or magnesium available to form the corresponding insoluble scale-forming silicate.

To minimize the formation of sulphate or carbonate scale produced from waters softened by the conventional lime or lime-soda processes, it has been the practice to reduce the concentration of the residual calcium and magnesium ions present in the water by further treatment with a base exchange mineral, such as sodium zeolite, externally to the boiler. Such treatment, however, does not completely remove these elements and enough remains to form scale if silica is available in solution in the water to combine therewith when such water is subjected to the concentrating action effected by the boiler. At present it appears possible in some instances to reduce the tendency for such treated water to form silicate scale by producing within the boiler a certain concentration of phosphate ion derived from a soluble phosphate which brings about the formation of relatively insoluble calcium phosphate and magnesium hydroxide as a sludge in preference to the formation of the scale-forming silicates. However, in spite of such phosphate treatment, scale may form which consists of the phosphates of calcium intermixed either with calcium or magnesium silicate, or both, and other substances. The use of a soluble phosphate as a scale preventive has the objection that, inasmuch as it must be present in the water in the boiler to be effective, the total solids in the boiler water are thereby increased and the presence of sludge incidental to the use of phosphate promotes priming and foaming difficulties. Thus the known methods for treating water, which only provide for the partial removal of the cations, (Ca and Mg), do not completely overcome the tendency for scale to form in pressure boilers employing feed water containing dissolved silica, and such agents as are now used to minimize scale formation cause other difficulties which are not easily remedied.

In the present invention I provide for the substantial removal of the dissolved silica, or the anion of the scale-forming compounds thereof, so as to preclude the formation of silicate scale in the boiler without otherwise producing a detrimental effect on the boiler water. My invention is based upon the discovery that, under certain conditions, the soluble silica contained in natural or treated water may be substantially removed by treating the water, preferably before it enters the boiler although it may be treated within the boiler when so desired, with a water soluble compound such as the chloride, nitrate, or sulphate of one of the elements cadmium, zinc, or maganese. These compounds, hereinafter referred to as silica removal or precipitating agents, form insoluble silicates with the silica which may be filtered off or allowed to settle, leaving the water substantially free from dissolved or scale-forming silica.

To the accomplishment of the foregoing and related ends, the invention, then, consists of the method hereinafter fully described and particularly pointed out in the claims, the following description setting forth in detail several modes of carrying out the invention, such disclosed modes illustrating, however, but several of various ways in which the principle of the invention may be used.

The application of my silica removing agents to the water to be treated may be carried out in various ways. According to one embodiment of my invention, for example, I may add the agent to a natural water which is undergoing a softening treatment by lime, soda ash, or the like at ordinary temperatures and in such a case I prefer to add an aqueous solution of one of said agents immediately following the addition of the softening compounds. In so doing I gain the advantage that the precipitates of calcium carbonate and magnesium hydroxide, which form due to the reaction of the softening compounds, is made more flocculent by the co-precipitation therewith of the silicates which are formed from the silica in the water and the silica-removing agent. Furthermore, the water to which the aforementioned silica removal agents are added should possess adequate alkalinity to permit the formation of the insoluble silica compounds. The alkalinity of lime or soda ash treated water is high enough, for the purpose of my invention, when the amount of lime used is slightly in excess of the amount required to neutralize the bicarbonate alkalinity of the untreated water.

In another embodiment of my invention I may first treat the water with lime, or lime and soda ash, employing from 3 to 50 p.p.m. of these chemicals in excess of the stoichiometric proportions adapted to the composition of the water to be softened. Then after the softening reactions have begun and the particles of calcium carbonate, magnesium hydroxide and other solids in suspension have begun to coagulate and settle I may mix one or more of my silica precipitating agents therewith, allow the silica precipitation to proceed and then further subject the water together with the suspended coagulating solids to any one of the several known methods of clarifying and/or filtering suspended matter from water.

In another method of applying my invention during the conventional lime or lime-soda softening process I may filter off or otherwise collect the sludge formed from both the softening compounds and the silica removing agents and return a portion of such sludge to the mixer in which raw water, softening compounds, and silica removal agents are added. By thus returning a portion of the sludge I gain the advantage that subsequent coagulation and settling of suspended solids is improved.

In still another embodiment of my invention I may subject the raw water to a conventional hot lime or lime-soda softening treatment and coincidently precipitate the soluble silica by means of one or more of my silica removal agents. The stage in such a process to introduce the silica removal agent varies with the nature of the water undergoing treatment. It is convenient, however, to add such agents coincidently with those used for the softening reactions.

I will now describe a method for applying my silica removal agents in connection with a conventional softening process for the preparation of water substantially free from dissolved silica. The raw water may be led into a mixing chamber and there mixed with a softening compound such as lime, soda ash or the like, and a coagulant such as alum, iron chloride and the like, employing from one-half to three minutes or more of time for mixing. Then the water thus treated and mixed with the softening agents is led into a second mixing chamber where one or more of the silica removal agents are added and intimately mixed with the water for a period of one-half to three or more minutes, or the silica removal agent may be added to the water coincidently with the softening compounds. The amount of lime or other alkaline softening compound to be employed is determined by the bicarbonate alkalinity of the raw water, the degree of reduction of bicarbonate alkalinity and permanent hardness contemplated, and the amount of silica removal agent employed. Inasmuch as the silica removal agents liberate an equivalent amount of acid, a sufficient amount of alkali such as lime, soda ash, and the like should be present to neutralize the same. The amount of acid liberated is indicated by the chemical equations which follow. Where the amount of alkali which is added for the purpose of softening the water is insufficient to absorb such liberated acid, additional alkali or softening compounds may be introduced into the water to neutralize the same. The amount of lime or other alkaline softening compound supplied to the mixing chamber is, therefore, calculated from the above considerations, or the rate of lime addition may be so adjusted that the water, after mixing with lime, alum, and silica removal agent, possesses a small amount of free caustic alkalinity, from 3 to 50 p.p.m. being satisfactory in most instances. After introducing the silica removal agent or agents, the water may be allowed to remain in a quiescent or semi-quiescent state for such a period of time as will allow adequate coagulation and settling of the precipitated solids to permit separating the same from the water, by filtration, decantation, or the like; or the water and suspended solids may be further subjected to a gentle mixing before settling. Settling may be carried out in a settling basin or by means of a mechanically operated clarifier or by a combination of such means, followed by filtering. With some sources of water, better coagulation of the precipitated or suspended solids, or both, occurs when either the coagulant or the silica removal agent, or both, are added to the water before the softening agents are mixed therewith.

The amount of any one of the specified agents or mixtures thereof to be used in a particular case may be adjusted to the stoichiometric proportions of dissolved silica in the water. However, inasmuch as natural or treated waters containing dissolved silica vary greatly in their chemical behavior, the proper amount of silica removal agent to employ varies somewhat with each water. For example, a water which contains a relatively large amount of dissolved silica, such as one containing from about 50 to 100 parts per million or more of silica, expressed as $SiO_2$, may have its silica content reduced to from about 1 to 5 p.p.m. by employing approximately stoichiometrical proportions of cadmium sulphate, for instance, as indicated in the following chemical equation:—

$$CdSO_4 + SiO_2 + H_2O = CdSiO_3 + H_2SO_4$$

Similar equations indicating the proportions of the other agents effective to remove silica according to my invention are as follows:—

$$ZnSO_4 + SiO_2 + H_2O = ZnSiO_3 + H_2SO_4$$
$$MnSO_4 + SiO_2 + H_2O = MnSiO_3 + H_2SO_4$$

On the other hand, where the water has a relatively low dissolved silica content, such as from 1 to 5 p.p.m., from about one to as much as fifteen times the stoichiometrical proportions indicated by the equations may be used. The addition of a smaller proportion of a silica removal agent causes a partial removal of the dissolved silica.

The following examples further illustrate the treatment of hard water for the purpose of removing soluble silica coincidently with a lime softening process.

Example 1

A natural water containing approximately 170 p.p.m. of bicarbonate alkalinity and approximately 170 p.p.m. total hardness was treated with a slurry of lime, followed by 10 p.p.m. of alum ($Al_2(SO_4)_3$). The amount of lime used was such that after thorough mixing of the lime slurry and water the total hardness was reduced to 75 p.p.m., the total alkalinity was reduced to approximately 50 p.p.m., and approximately 20 p.p.m. of free lime remained, all expressed in terms of $CaCO_3$. To 45 gallons of said water containing 6 p.p.m. of dissolved $SiO_2$, immediately following the addition of lime and alum in the amounts above indicated, I added 23.5 cc. of a 20 per cent solution of zinc sulphate while stirring the same to give an intimate mixing of the water with the zinc sulphate solution, lime slurry, and alum. After three minutes of mixing the precipitates formed were allowed to settle and then the supernatant water was filtered. The analysis of a sample of the filtrate showed substantially complete removal of silica. In this example the total amount of dissolved silica originally present was 1.02 grams and the amount of zinc sulphate ($ZnSO_4$) employed was about 5.3 grams, so that the ratio of the amount of zinc sulphate employed to the amount required as shown by the stoichiometrical relationship indicated by the equation;
$ZnSO_4 + SiO_2 + H_2O = ZnSiO_3 + H_2SO_4$, was 1.93.

Example 2

A sample of a natural hard water containing about 4 p.p.m. of dissolved silica was treated with lime and alum in similar manner to that of Example 1 so as to soften the same and to produce a caustic alkalinity of about 17 p.p.m. Then enough of a 20 per cent solution of cadmium sulphate to provide approximately five times the stoichiometric proportion of cadmium sulphate was added to the sample while the same was being stirred. The precipitates which formed were allowed to settle and the supernatant liquid was filtered. The analysis of the filtrate for dissolved silica showed that less than 0.3 p.p.m. of silica remained therein.

Example 3

A sample of a natural hard water containing about 4 p.p.m. of dissolved silica was treated with lime and alum in similar manner to that of Example 1 so as to soften the same and to produce a caustic alkalinity of about 17 p.p.m. Then enough of a 5 per cent solution of manganese sulphate to provide approximately fifteen times the stoichiometric proportion of manganese sulphate was added to the same while being stirred. The precipitates which formed were allowed to settle and the supernatant liquid was filtered. The analysis of the filtrate for dissolved silica showed that less than 1 p.p.m. of silica remained therein.

While I have described my invention more particularly in connection with conventional water softening processes it is to be understood that I do not wish to limit myself thereto inasmuch as my silica removal method may be applied to waters which may not be undergoing a softening treatment. For example, I may add one or more of my silica removal or precipitating agents to a water containing dissolved silica and a sufficient quantity of an alkali, such as ammonia, caustic soda, lime, or the like to neutralize the acid liberated from the silica removal agent.

Other modes of applying the principles of my invention may be employed instead of those explained, change being made as regards the method herein disclosed, provided the step or steps stated by any of the following claims or the equivalent of such stated step or steps be employed.

I therefore particularly point out and distinctly claim as my invention:—

1. The method of removing soluble silica compounds from water which comprises mixing with the water a soluble salt of a metal selected from the group consisting of cadmium, manganese, and zinc, in the presence of an alkali.

2. The method of removing soluble silica compounds from water which comprises mixing with the water a compound selected from the group consisting of the chlorides, nitrates and sulphates of cadmium, manganese, zinc, and adding an alkali.

3. The method of removing soluble silica compounds from water which comprises mixing with the water a soluble salt of a metal selected from the group consisting of cadmium, manganese, and zinc, and adding an alkaline softening agent selected from the group consisting of lime, soda ash, and caustic soda.

4. The method of removing soluble silica compounds from water which comprises mixing with the water a compound selected from the group consisting of the chlorides, nitrates and sulphates of cadmium, manganese, and zinc, and adding an alkaline softening agent selected from the group consisting of lime, soda ash, and caustic soda.

5. The method of removing soluble silica compounds from water which comprises mixing with the water a soluble salt of a metal selected from the group consisting of cadmium, manganese, and zinc and adding a coagulant and an alkaline softening agent selected from the group consisting of lime, soda ash, and caustic soda.

6. The method of removing soluble silica compounds from water which comprises mixing with the water an acqueous solution of zinc sulphate and an alkali.

7. The method of removing soluble silica compounds from water which comprises mixing with the water a soluble zinc salt, in the persence of an alkali.

HANS A. REIMERS.